(12) United States Patent
Di et al.

(10) Patent No.: US 9,917,438 B2
(45) Date of Patent: Mar. 13, 2018

(54) POLARITY RECOGNITION AND SWAPPING FOR DC POWERED DEVICES

(71) Applicant: Fortinet, Inc., Sunnyvale, CA (US)

(72) Inventors: Hongxun Di, Richmond (CA); Lin Nan Zhao, Burnaby (CA); Zhuoyong Wang, Delta (CA)

(73) Assignee: Fortinet, Inc., Sunnyvale, CA (US)

( * ) Notice: Subject to any disclaimer, the term of this patent is extended or adjusted under 35 U.S.C. 154(b) by 250 days.

(21) Appl. No.: 14/831,774

(22) Filed: Aug. 20, 2015

(65) Prior Publication Data

US 2017/0054290 A1    Feb. 23, 2017

(51) Int. Cl.
| | | |
|---|---|---|
| *H01H 47/00* | (2006.01) | |
| *H02H 11/00* | (2006.01) | |
| *H02J 7/00* | (2006.01) | |

(52) U.S. Cl.
CPC ............. *H02H 11/002* (2013.01); *H02J 7/00* (2013.01)

(58) Field of Classification Search
None
See application file for complete search history.

(56) References Cited

U.S. PATENT DOCUMENTS

| | | | | |
|---|---|---|---|---|
| 9,035,602 B2 * | 5/2015 | Jing | ...................... | H02J 7/0044 |
| | | | | 320/103 |
| 9,081,395 B2 * | 7/2015 | Jin | ............................ | G05F 5/00 |
| 2013/0200874 A1 * | 8/2013 | Jin | ........................ | H02H 11/002 |
| | | | | 323/299 |
| 2014/0055078 A1 * | 2/2014 | Jing | ...................... | H02J 7/0044 |
| | | | | 320/103 |

* cited by examiner

*Primary Examiner* — Long Nguyen
(74) *Attorney, Agent, or Firm* — Hamilton, DeSanctis & Cha LLP (57) ABSTRACT

A system for recognizing and swapping polarity for DC powered devices that includes a polarity detection module that is configured to identify polarity of DC power input, and further configured to send an output to a controller based on identification of polarity of the DC power input. The system includes a power switch array that is operatively coupled with the controller, and wherein the controller, based on the output, can set one or more switches of the power switch array for executing polarity switching.

21 Claims, 3 Drawing Sheets

POLARITY RECOGNITION AND SWAPPING FOR DC POWERED DEVICES

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever. Copyright © 2015, Fortinet, Inc.

BACKGROUND

Field

Embodiments of the present invention generally relate to the field of DC powered electrical devices. More particularly, embodiments of the present invention relate to automatic recognition and swapping of polarity for DC powered electronic devices/systems.

Description of the Related Art

Electronic devices are designed to operate at certain predefined voltage/power profiles, requiring constant input power supply. Any fluctuation or unwanted input supply can damage the electronic device or an attached load. To protect these electronic devices from such damage, different types of protection circuits such as over current protection circuits, over voltage protection circuit, under voltage protection circuit, among others are generally attached with such electronic devices/loads. In case of DC powered electronic devices, where power to the devices is provided by a battery or DC power source, power must typically be provided with a particular polarity.

DC powered electronic devices present an essential problem regarding correct polarity activation of electronic circuits. In some cases, it is possible that the required polarity is not indicated on the electronic device, or that the polarity marks on the power source are not visible properly. In such cases, it becomes difficult for an electrician or for any person to attach a right pole/terminal of the power source with the right terminal of the electronic device. If the DC powered electronic device is attached with terminals of opposite polarity, it can damage both the attached electric device and/or the power source.

Though the problem of polarity detection is applicable for all electronic devices, it is more serious in the field of telecommunication and network devices where the devices are polarity specific. Many times the power supply in the telecommunication/network devices comes from a long distance, and the poles/wires marks may not be proper or can be misleading. For example, in order to run a telecommunication device, a low power DC voltage can be supplied from a telephone exchange to a remotely located device, and it becomes difficult for a deployment person to decide the polarity of the terminals. Similarly for network equipment that requires 48V DC input and are polarity specific, power is supplied through two cables, one carrying +48V and the other −48V. To help prevent human errors, some devices also use labels such as "+/−", "−48V/RTN" or other variations to specify the polarities, which in creates confusion and is troublesome to customers during on-site installation and maintenance.

Therefore, there is a need of a system and circuit that solves above-mentioned issues, and enables efficient/automatic detection and switching of polarization, if required, for a DC powered electronic device.

SUMMARY

Embodiments of the present invention generally relate to the field of DC powered electrical devices. More particularly, embodiments of the present invention relate to automatic recognition and swapping of polarity for DC powered electronic devices/systems.

In an aspect, the present disclosure relates to a system for recognizing and swapping polarity for DC powered devices, wherein the system can include a polarity detection module that is configured to identify polarity of DC power input, and further configured to send an output to a controller based on identification of polarity of the DC power input. The system can further include power switch control logic that is operatively coupled with the controller, and wherein the controller, based on the output, can set one or more switches of the power switch control logic for executing polarity switching.

In an aspect, the system can further include a rectifier bridge module that can be configured to output required polarity. The system can further include an isolated power regulator that can be configured between the rectifier bridge module and the controller, wherein the isolated power regulator can convert the DC power input to a lower voltage to enable required isolation between the DC power input and the controller to be achieved. In another aspect, when the DC power input to the isolated power regulator exceeds a defined threshold, a predefined voltage is sourced to the controller.

In another aspect, the controller can be configured based on any or a combination of a fixed logic circuit, and a high level micro-controller. In yet another aspect, an isolator device can be configured between the polarity detection module and the controller, wherein the isolator device can pass the output of the polarity detection module to the controller through an isolator.

In another aspect, the system can further include an isolated driver that can be configured between the controller and the power switches, wherein the isolated driver can be configured to translate commands from the controller to the power switches while providing isolation.

In another aspect, the power switches comprise a power switch array. In an embodiment, the power switches can be an array comprising four switches, which can be a MOSFET based array. In an aspect, the isolated driver can include one or more photovoltaic drivers. In another aspect, the power switch control logic can include a plurality of power switch arrays, each comprising one or more switches. In yet another aspect, the power switch control logic can include two MOSFET's that can be configured in face-to-face mode or back-to-back mode to function as one switch for a switch array. In an embodiment, the power switch control logic can be a power switch array that can be based on one or a combination of insulated gate bipolar transistor (IGBT), mechanical relays, and solid state relays.

In an aspect, system of the present disclosure can include a power regulator that can be operatively coupled with the controller, wherein the power regulator can regulate the DC power input to a voltage level used by the system. The system can further include an input power monitoring and protection means that is operatively coupled with the power regulator and can be configured to monitor the status of the power source, wherein power source monitoring can include monitoring of one or a combination of voltage, current, power, and temperature, and wherein feedback of the monitoring can be given to the controller. In yet another aspect, the system can include an output power monitoring and protection means that is operatively coupled with the power regulator and is configured to monitor the status of the power source, wherein power source monitoring can include monitoring of one or a combination of voltage, current, power, and temperature, and wherein feedback of the monitoring is given to the controller.

In an aspect, the present disclosure further relates to a system for recognizing and swapping polarity for DC powered devices, wherein the system can include a polarity detection module that can be configured to identify polarity of a DC power input, and can further be configured to send an output to a controller based on identification of polarity of said DC power input. The system can further include a power switch having four switches that are operatively coupled with said controller, wherein said controller, based on said output from the polarity detection module, closes two of the four switches of said power switch array for executing polarity switching. In an aspect, if the polarity detection module detects the first DC input to be positive and second DC input to be negative, output from the polarity detection module can enable the controller to close a first set of two switches of the power switch array, and wherein if the polarity detection module detects the first DC input to be negative and second DC input to be positive, output from the polarity detection module enables the controller to close a second set of two switches of the power switch array.

Other features of embodiments of the present invention will be apparent from accompanying drawings and from detailed description that follows.

BRIEF DESCRIPTION OF THE DRAWINGS

The accompanying drawings are included to provide a further understanding of the present disclosure, and are incorporated in and constitute a part of this specification. The drawings illustrate exemplary embodiments of the present disclosure and, together with the description, serve to explain the principles of the present disclosure.

DETAILED DESCRIPTION

Systems and semiconductor circuits are described for automatically recognizing and swapping or reversing polarization of a DC input for DC powered electronic devices. In the following description, numerous specific details are set forth in order to provide a thorough understanding of embodiments of the present disclosure. It will be apparent to one skilled in the art that embodiments of the present disclosure may be practiced without some of these specific details.

Embodiments include various steps, which will be described below. Some of the steps may be performed by hardware components or may be embodied in machine-executable instructions, which may be used to cause a general-purpose or special-purpose processor programmed with the instructions to perform the steps. Alternatively, steps may be performed by a combination of hardware, and software, or firmware.

Embodiments of the present disclosure may be provided in part as a computer program product, which may include a machine-readable storage medium tangibly embodying thereon instructions, which may be used to program a computer (or other electronic devices) to perform a process. The machine-readable medium may include, but is not limited to, fixed (hard) drives, magnetic tape, floppy diskettes, optical disks, compact disc read-only memories (CD-ROMs), and magneto-optical disks, semiconductor memories, such as ROMs, PROMs, random access memories (RAMs), programmable read-only memories (PROMs), erasable PROMs (EPROMs), electrically erasable PROMs (EEPROMs), flash memory, magnetic or optical cards, or other type of media/machine-readable medium suitable for storing electronic instructions (e.g., computer programming code, such as software or firmware).

Various methods described herein may be practiced by combining one or more machine-readable storage media containing the code according to the present disclosure with appropriate circuits and standard computer hardware to execute the code contained therein.

If the specification states a component or feature "may", "can", "could", or "might" be included or have a characteristic, that particular component or feature is not required to be included or have the characteristic.

Although the present disclosure has been described with the purpose of automatically recognizing and swapping polarization for DC powered electronic devices, it should be appreciated that the same has been done merely to illustrate the disclosure in an exemplary manner and any other purpose or function for which the explained structure or configuration can be used, is covered within the scope of the present disclosure.

Exemplary embodiments will now be described more fully hereinafter with reference to the accompanying drawings, in which exemplary embodiments are shown. This disclosure may, however, be embodied in many different forms and should not be construed as limited to the embodiments set forth herein. These embodiments are provided so that this disclosure will be thorough and complete and will fully convey the scope of the disclosure to those of ordinary skill in the art. Moreover, all statements herein reciting embodiments of the disclosure, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure).

Thus, for example, it will be appreciated by those of ordinary skill in the art that the diagrams, schematics, illustrations, and the like represent conceptual views or processes illustrating systems and methods embodying this disclosure. The functions of the various elements shown in the figures may be provided through the use of dedicated hardware as well as hardware capable of executing associated software. Similarly, any switches shown in the figures are conceptual only. Their function may be carried out through the operation of program logic, through dedicated logic, through the interaction of program control and dedicated logic, or even manually, the particular technique being selectable by the entity implementing this disclosure. Those of ordinary skill in the art further understand that the exemplary hardware, software, processes, methods, and/or operating systems described herein are for illustrative purposes and, thus, are not intended to be limited in any manner or to any named element/component.

Embodiments of the present invention generally relate to the field of DC powered electrical devices. More particularly, embodiments of the present invention relate to automatic recognition and swapping of polarity for DC powered electronic devices/systems.

In an aspect, the present disclosure relates to a system for recognizing and swapping polarity for DC powered devices, wherein the system can include a polarity detection module that is configured to identify polarity of DC power input, and further configured to send an output to a controller based on identification of polarity of the DC power input. System of the present disclosure can further include power switches that are operatively coupled with the controller, and wherein the controller, based on the output, can set one or more of the power switches for executing polarity switching.

In an aspect, the system can further include a rectifier bridge module that can be configured to output required polarity for power regulator of the controller. System of the present disclosure can further include an isolated power regulator that can be configured between the rectifier bridge module and the controller, wherein the isolated power regulator can convert the DC power input to a lower voltage to enable required isolation between the DC power input and the controller to be achieved. In another aspect, when the DC power input to the isolated power regulator exceeds a defined threshold, a predefined voltage is sourced to the controller.

In another aspect, the controller can be configured based on any or a combination of a fixed logic circuit, and a high level micro-controller. In yet another aspect, an isolator device can be configured between the polarity detection module and the controller, wherein the isolator device can pass the output of the polarity detection module to the controller through an isolator.

In another aspect, system of the present disclosure can further include an isolated driver that can be configured between the controller and the power switch control logic, wherein the isolated driver can be configured to translate ON/OFF commands from the controller to the power switch control logic while providing isolation.

In another aspect, the power switches comprise a power switch array. In an embodiment, the power switches can be an array comprising four switches, which can be a MOSFET based array. In an aspect, the isolated driver can include one or more photovoltaic drivers. In another aspect, the power switch control logic can include a plurality of power switch arrays, each comprising one or more switches. In yet another aspect, the power switch control logic can include two MOSFET's that can be configured in face-to-face mode or back-to-back mode to function as one switch for a switch array. In an embodiment, the power switch control logic can be a power switch array that can be based one or a combination of insulated gate bipolar transistor (IGBT), mechanical relays, and solid state relays.

In an aspect, system of the present disclosure can include a power regulator that can be operatively coupled with the controller, wherein the power regulator can regulate the DC power input to a voltage level used by the system. System of the present disclosure can further include an input power monitoring and protection means that is operatively coupled with the power regulator and can be configured to monitor status of power source, wherein power source monitoring can include monitoring of one or a combination of voltage, current, power, and temperature, and wherein feedback of the monitoring can be given to the controller. In yet another aspect, system of the present disclosure can include an output power monitoring and protection means that is operatively coupled with the power regulator and is configured to monitor the status of the power source, wherein power source monitoring can include monitoring of one or a combination of voltage, current, power, and temperature, and wherein feedback of the monitoring is given to the controller.

In an aspect, the present disclosure further relates to a system for recognizing and swapping polarity for DC powered devices, wherein the system can include a polarity detection module that can be configured to identify polarity of a DC power input, and can further be configured to send an output to a controller based on identification of polarity of said DC power input. System of the present disclosure can further include a power switch array having four switches that are operatively coupled with said controller, wherein said controller, based on said output from the polarity detection module, closes two of the four switches of said power switch array for executing polarity switching. In an aspect, if the polarity detection module detects the first DC input to be positive and second DC input to be negative, output from the polarity detection module can enable the controller to close a first set of two switches of the power switch array, and wherein if the polarity detection module detects the first DC input to be negative and second DC input to be positive, output from the polarity detection module enables the controller to close a second set of two switches of the power switch array.

Figure 1:
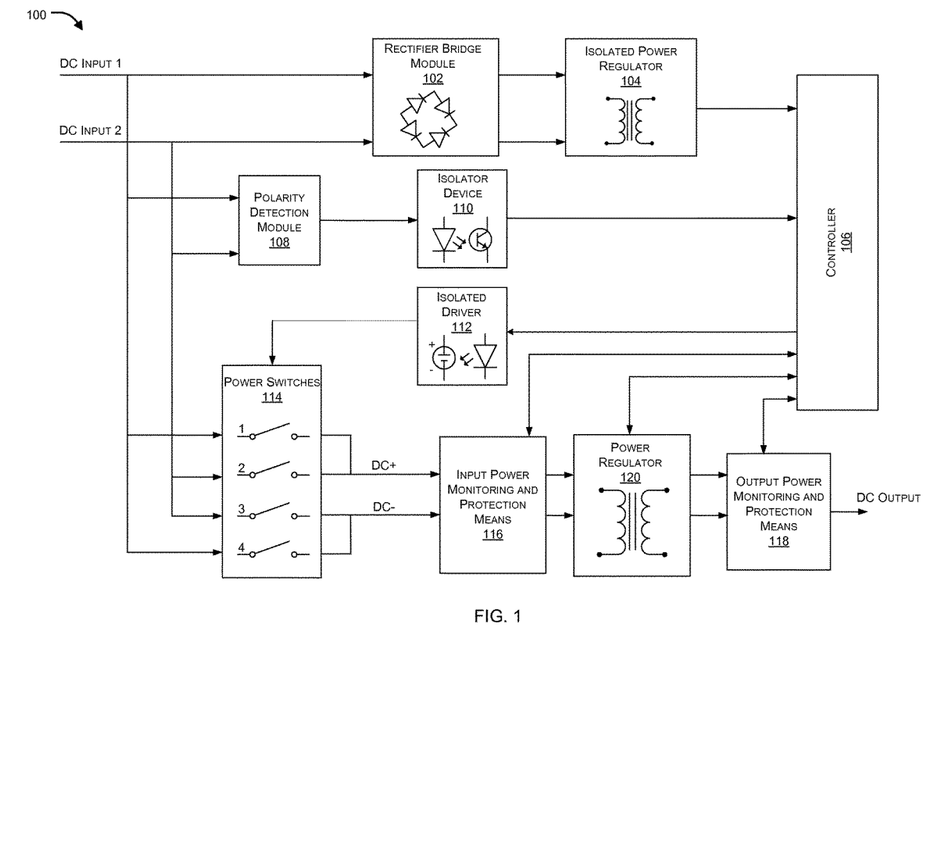
FIG. 1 illustrates an exemplary circuit diagram for enabling automatic recognition and swapping of polarization for DC powered electronic devices in accordance with an embodiment of the present disclosure.

FIG. 1 illustrates an exemplary circuit diagram 100 for enabling automatic recognition and swapping of polarization for DC powered electronic devices in accordance with an embodiment of the present disclosure. An exemplary polarization detection and correction system of the present disclosure can be implemented as circuit arrangement as shown in FIG. 1, which can include a polarity detection module 108 that is configured to identify polarity of DC power input, and further configured to send an indication of detected polarity of DC power input to a controller 106, and a power switch array 114 that can be configured by setting one or more switches of the power switch array 114 to switch/correct the polarity of the DC power being supplied to the load. In an exemplary implementation, exemplary circuit arrangement 100 for polarity detection and correction can further include a rectifier bridge module 102 that can be configured to output required polarity for isolated power regulator 104, and an isolated power regular 104 that is configured to be placed between the rectifier bridge module 102 and the controller 106 and output a DC power of a lower voltage to the controller 106, wherein the controller 106 can be configured to issue instructions for the power switch array 114.

In an exemplary implementation, circuit arrangement of the present disclosure can further include an isolator device 110 that can be placed/configured between polarity detection module 108 and the controller 106, wherein the isolator device 110 can be configured to pass the output of the polarity detection module 108 to the controller 106 and/or to isolate the controller 106 from the polarity detection module 108.

In an example implementation, rectifier bridge module 102 can be configured to control power being supplied to the controller 106, wherein the rectifier bridge module 102 can output the power for controller 106 in required polarity and ensure that the power with appropriate polarity is being supplied to the controller 106. As the power requirement of the controller 106 is not very high, in an exemplary implementation, a 4-diode rectifier bridge can be used for implementation of the rectifier bridge module 102.

In an aspect, circuit arrangement 100 can further include an isolated power regulator 104 that can be configured to convert the DC input power to a lower voltage as required by the controller 106. In an exemplary implementation, isolated power regulator 104 can be configured to handle a high Vin/Vout ratio as well as any required isolation between the DC supply and the controller 106. In an exemplary implementation, isolated power regulator 104 can include a switching mode that isolates the DC/DC voltage regulator.

In an exemplary implementation, isolated power regulator 104 can be placed between rectifier bridge 102 and controller 106 and can be configured to convert DC power input to a lower voltage required to run the controller 106, and/or to enable required isolation between the DC power input and the controller 106. The isolated power regulator 104 can include an over voltage detection circuit and can be configured to drop or stabilize the voltage being supplied to the controller 106 to enable continuous operation of the controller 106. In an exemplary implementation, isolated power regulator 104 can be configured to supply a predefined voltage to the controller 106.

In an exemplary embodiment, controller 106 of the present disclosure can be configured to receive an indication of the detected polarity from polarity detection module 108 through the isolator 110, and based on the detected polarity, the controller 106 can issue instructions for the power switch array 114 to configure the switch in such as way that the polarity can be swapped. In different implementations, the controller 106 can be implemented as a simple fixed logic circuit or using a high level micro-controller. In specific cases, pre-existing intelligent platform management controller (IPMC) can be used as controller 106 of the present disclosure. Such use of pre-existing platform can simplify and minimize the cost of polarization detection and swapping system of the present disclosure.

In an exemplary implementation, polarity detection module 108 can be configured to detect the first DC input to be positive and second DC input to be negative, wherein output from the polarity detection module 108 can enable the controller 106 to close a first set of two switches of the power switch array 114. In case the polarity detection module 108 detects the first DC input to be negative and second DC input to be positive, output from the polarity detection module 108 enables the controller 106 to close a second set of two switches of the power switch array 114.

In an exemplary implementation, isolator device 110 can be configured between the polarity detection module 108 and the controller 106 to pass the detected polarity information to the controller 106. Isolator device 110 may be required between the front-end DC components, such as polarity detection module 108 and the controller 106. In an exemplary implementation, opto-couplers or similar isolators can be used for implementing the isolator device 110.

In an exemplary implementation, circuit arrangement of the present disclosure can also include an isolated driver 112 that can be placed between the controller 106 and the power switch array 114, wherein the driver 112 can be configured to transfer instructions from the controller 116 to the power array 114. Exemplary instructions from the controller 116 to the power array 114 can include ON/OFF instructions for one or more switches of the power array 114. In an exemplary implementation, isolated driver 112 can be a photovoltaic driver.

In another exemplary implementation, power switch array 114, also interchangeably referred to as switch array hereinafter, can be configured to receive instructions from the controller 106 and actuate one or more switches such as switch 1, switch 2, switch 3, and switch 4 of the array 114 so as to output the power in correct polarity. In an exemplary implementation, power switch array 114 can be implemented using MOSFETs as a typical MOSFET can sustain high current while maintaining low cost, low turn-on resistance, and low profile. In different implementations, in order to maintain full cut-off between input and output, two MOSFETs can be placed in serial face-to-face mode to function as one switch for a switch array with a total of eight MOSFETs. Although the example is shown with MOSFET based implementation, implementation of power switch array 114 using other means such as IGBT (insulated gate bipolar transistor), mechanical relays, and solid state relays, or a combination thereof, can always be considered, and is well within the scope of the present disclosure.

In an aspect, circuit arrangement 100 can also include a power regulator 120 that can be coupled with the controller 106 to regulate the DC power input to a voltage level used by the circuit. In an exemplary implementation, power regulator 120 can be configured to regulate the voltage being supplied to the attached load/appliances, wherein the power regulator 120 can also be controlled and/or regulated with help of the controller 106. In an aspect, the power regulator 120 can include over current, over voltage, and an under voltage conditions detector for detecting and controlling the power/voltage being supplied to the attached load/appliances. In an exemplary implementation, power regulator 120 can include a feedback loop for providing the over current, over voltage, under voltage conditions detected by the power regulator 120 to the controller 106. In an exemplary implementation, power regulator 120 can include a regulator circuit that only outputs required voltage/current to the attached load. In an exemplary implementation, a switching mode isolated DC/DC voltage regulator can be used for regulating the voltage being supplied to the attached load.

In an aspect, circuit arrangement 100 can further include an input monitoring and protection means 116 that can be operatively coupled with the power regulator 120 to monitor status of power source, and/or combination of voltage, current, power, and temperatures. In an exemplary implementation, input power monitoring and protection means 116 can be configured to provide feedback to the controller 106 based on the measurement. In another exemplary implementation, output power monitoring and protection means 118 can be configured to be operatively coupled with the power regular 120 to monitor status of output power. The power monitoring and protection means 118 can also be configured to detect voltage, current, power and temperature, and provide these details as feedback to the controller 106.

In an aspect, polarity detection and swapping system of present disclosure, as implemented by the exemplary circuit arrangement, can be well understood by the following illustration. When DC input power, through internal DC input 1 and DC input 2 is received by the system, the rectifier bridge module 102 can immediately output the DC power in the preferred polarity to the isolated power regulator 104. Once the DC input to the isolated power regulator 104 exceeds the predefined UVLO (Under-Voltage-Latch-Off) threshold, the switching mode regulator can source the predefined voltage to the controller 106, based on which the controller 106 can start operating after a short delay so as to provide sufficient time for output of isolated power regular 104 to stabilize. The controller 106 can also start its operation once output of the isolated power regulator 104 is stabilized, wherein the controller 106 can receive the polarity of attached input source as detected by the polarity detection module 108 and forwarded by the polarity detection module 108 through isolator device 110. Based on the detected polarity by the polarity detection module 108, the controller 106 can set appropriate switches such as switch 1 and switch 3, or switch 2 and switch 4 of the power switch array 114, as may be configured. For instance, in case the DC_Input_1 is positive and DC_Input_2 is negative, the polarity detection module 108 can send this information to the controller 106, based on which the controller 106 can close switch 1 and switch 3 to connect DC_Input_1 to DC+ and DC_Input_2 to DC−, while switch 2 and switch 4 remain open. On the other hand, if the input polarity was reversed, controller 106 can send the control signal to the power switch array 114 to close switch 2 and switch 4, while switch 1 and switch 3 remain open. System of the present disclosure can constantly output correct DC+/DC−, regardless of input polarity. In an exemplary implementation, default positions for switch 1, switch 2, switch 3, and switch 4 can be set to remain open to prevent accidental short circuit or a wrong polarity output.

In an aspect, once the polarity reversal, if necessary, is complete, DC power with desired polarity can pass through input power monitoring and protection means 116 to power regulator 120, where it is regulated down to various functional voltage levels. The final voltages can then pass through output power monitoring and protection means 118, and enter the Main System. During this last stage, the controller 106 can be configured to continuously monitor the status of the input and output power via means 116 and means 118. If any parameter is out of the predefined limits, the protection mechanisms will initiate to prevent any system failures, for example, by opening switches 1-4 of power switch array 114. In an aspect, the controller 106 can also be capable of communicating with the main system for a more centralized remote management, a desired feature of modern data centers.

Figure 3:
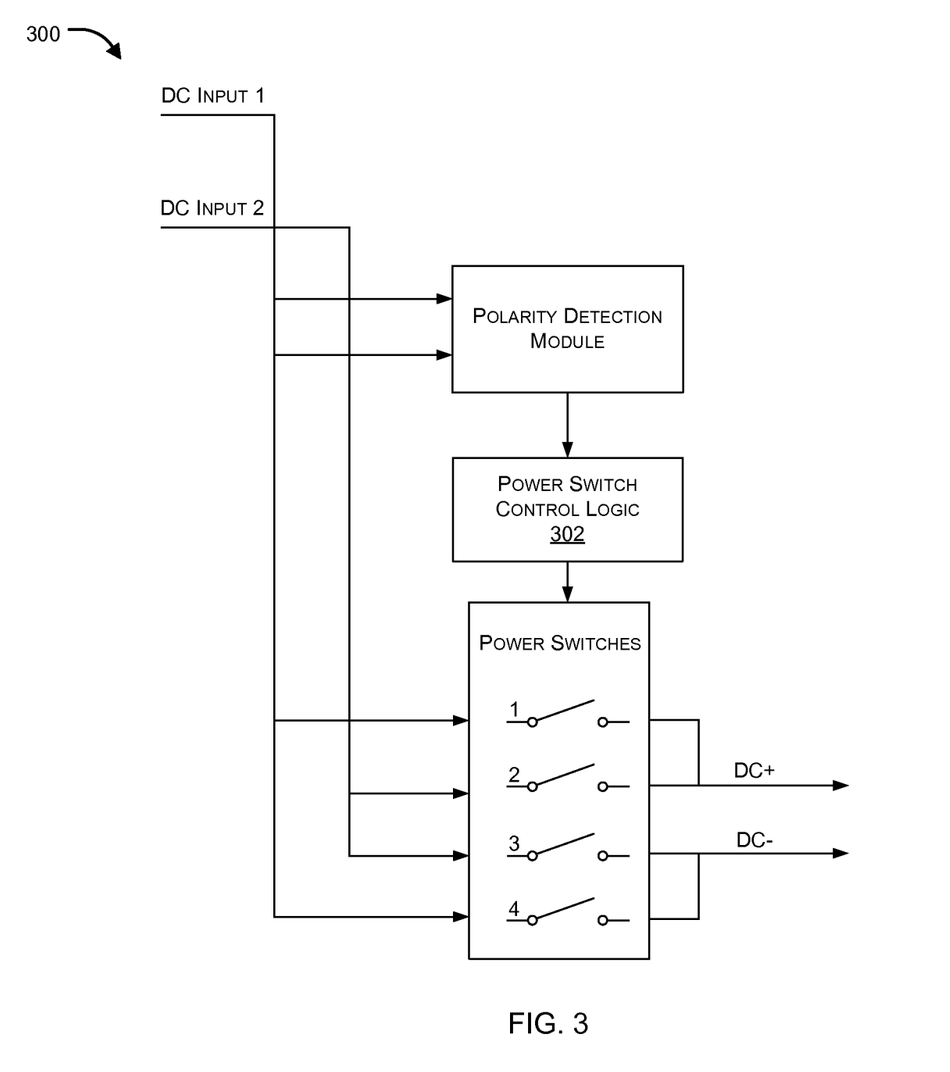
FIG. 3 describes an embodiment with power switch control logic directly between polarity detection module and power switches in accordance with an embodiment of the present disclosure.

In an aspect, it is to be appreciated, that the proposed design shown in FIG. 1 is an exemplary configuration, and depending on specific platform design requirements, several modules may be removed or merged while maintaining the auto-swapping element. For instance, as shown in FIG. 3, output of the polarity detection module 108 can be directly converted to appropriate control signals for power switch array 114 through simple logic circuitry such as power switch control logic 302 without passing through the controller 106, in which case the controller 106 and its supporting modules can be eliminated. Furthermore, means 116/118 and power regulator 120, as mentioned before, may already be pre-existing parts of a DC product, and therefore can also be removed for minimum configuration, which can lower system cost, minimize form factor and decrease control complexity.

Figure 2:
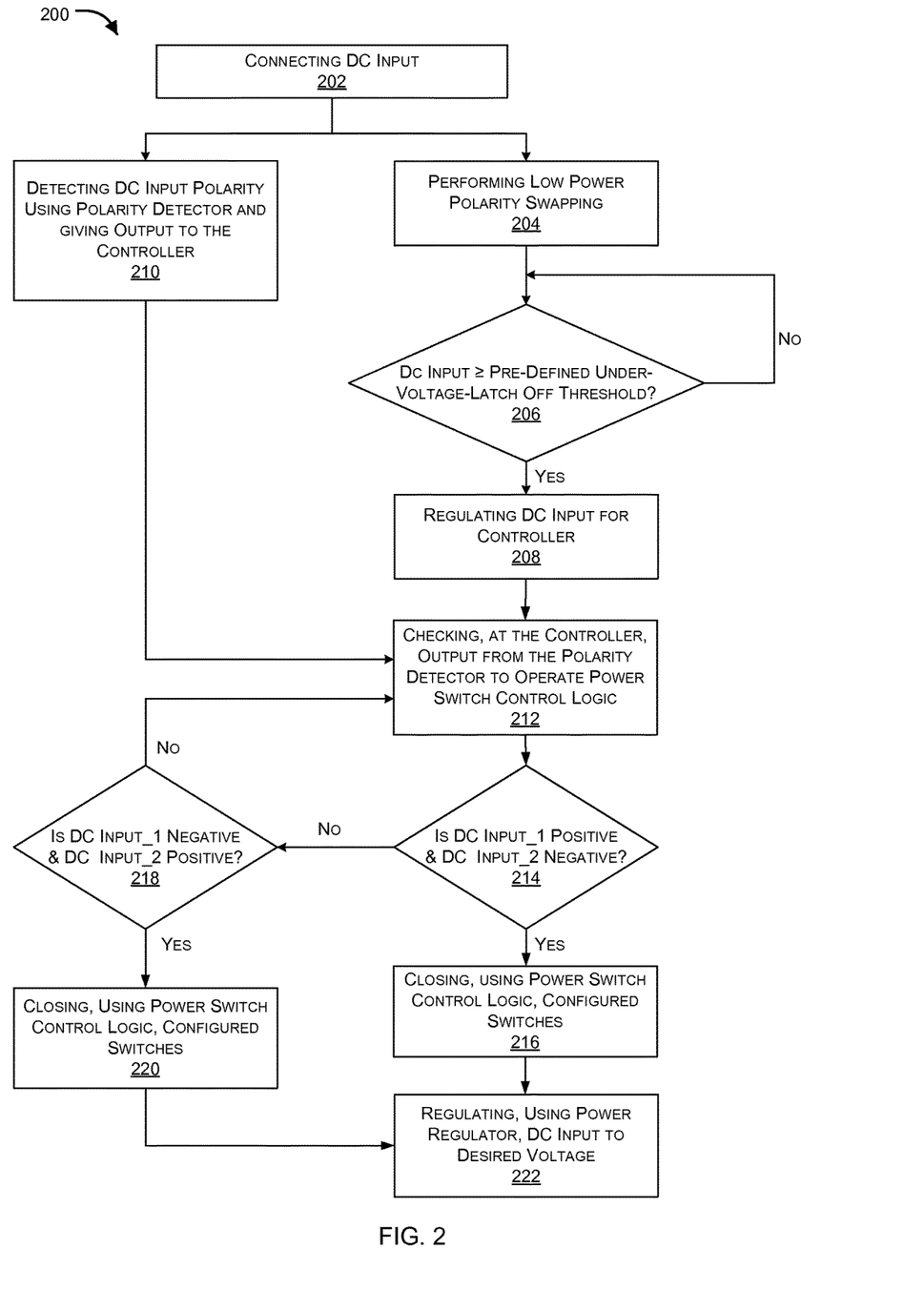
FIG. 2 illustrates an exemplary flow diagram of the proposed system in accordance with an embodiment of the present disclosure.

FIG. 2 illustrates an exemplary flow diagram 200 of the proposed system in accordance with an embodiment of the present disclosure. At step 202, DC input can be connected, and at step 204, low power polarity swapping can be performed when DC input power, through internal DC input 1 and DC input 2 is received by the system to enable immediate output of the DC power in preferred polarity to isolated power regulator. At step 206, it can be checked if the DC input to the isolated power regulator exceeds the predefined UVLO (Under-Voltage-Latch-Off) threshold, such that if the DC input exceeds, at step 208, the DC input can be regulated for use to controller. At step 210, a polarity detector can detect the DC input polarity and give input to the controller, based on which, at step 212, the controller can check the output from the polarity detector and controls power switch control logic.

At step 214, it can be checked if DC Input_1 is positive and DC Input_2 is negative, in which case, at step 216, the power switch control logic can close the configured switches, else, at step 218, it can be checked if DC Input_1 is negative and DC Input_2 is positive, in which case, at step 220, the power switch control logic can close the configured switches. At step 222, DC input can be regulated down to desired voltage.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously. Within the context of this document terms "coupled to" and "coupled with" are also used euphemistically to mean "communicatively coupled with" over a network, where two or more devices are able to exchange data with each other over the network, possibly via one or more intermediary device.

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc. The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

While embodiments of the present disclosure have been illustrated and described, it will be clear that the disclosure is not limited to these embodiments only. Numerous modifications, changes, variations, substitutions, and equivalents will be apparent to those skilled in the art, without departing from the spirit and scope of the disclosure, as described in the claims.

What is claimed is:

1. A system for recognizing and swapping polarity for DC powered devices comprising:
   a polarity detection module configured to identify polarity of DC power input, and further configured to send an output to a controller based on identification of polarity of said DC power input;
   a power switch array operatively coupled with said controller, wherein said controller, based on said output, sets one or more switches of said power switch array for executing polarity switching;
   a rectifier bridge module that is configured to output required polarity for power regulator of the controller; and
   an isolated power regulator that is configured between the rectifier bridge module and the controller, wherein the isolated power regulator converts the DC power input to a lower voltage to enable required isolation between the DC power input and the controller to be achieved.

2. The system of claim 1, wherein when DC power input to the isolated power regulator exceeds beyond a defined threshold, predefined voltage is sourced to the controller.

3. The system of claim 1, wherein the controller is selected from a group consisting of a logic circuit, and a micro-controller.

4. The system of claim 1, wherein the system further comprises an isolated driver configured between the controller and the power switch array, wherein the isolated driver is configured to translate ON/OFF commands from the controller to the power switch array while providing isolation.

5. The system of claim 4, wherein the isolated driver comprises one or more photovoltaic drivers.

6. The system of claim 1, wherein the power switch array comprises a MOSFET based array.

7. The system of claim 1, wherein at least one of the one or more switches of said power switch array comprises two MOSFETs that are configured in face-to-face mode or back-to-back mode to function as one switch in the array.

8. The system of claim 1, wherein at least one of the one or more switches of said power switch array comprises switches selected from a group consisting of insulated gate bipolar transistor (IGBT), mechanical relays, and solid state relays.

9. The system of claim 1, wherein the system comprises a power regulator operatively coupled with the controller, wherein the power regulator regulates the DC power input to a voltage level used by the system.

10. The system of claim 9, wherein the system further comprises an input power monitoring and protection means operatively coupled with the power regulator and configured to monitor status of power source, wherein power source monitoring comprises monitoring of one or a combination of voltage, current, power, and temperature, and wherein feedback of the monitoring is given to the controller.

11. The system of claim 9, wherein the system further comprises an output power monitoring and protection means operatively coupled with the power regulator and configured to monitor status of power source, wherein power source monitoring comprises monitoring of one or a combination of voltage, current, power, and temperature, and wherein feedback of the monitoring is given to the controller.

12. A system for recognizing and swapping polarity for DC powered devices comprising:
   a polarity detection module configured to identify polarity of DC power input, and further configured to send an output to a controller based on identification of polarity of said DC power input; and
   a power switch array operatively coupled with said controller, wherein said controller, based on said output, sets one or more switches of said power switch array for executing polarity switching, wherein an isolator device is configured between the polarity detection module and the controller, wherein said isolator device passes the output of the polarity detection module to the controller through an isolator.

13. The system of claim 12, wherein the controller is selected from a group consisting of a logic circuit, and a micro-controller.

14. The system of claim 12, wherein the system further comprises an isolated driver configured between the controller and the power switch array, wherein the isolated driver is configured to translate ON/OFF commands from the controller to the power switch array while providing isolation.

15. The system of claim 12, wherein the power switch array comprises a MOSFET based array.

16. The system of claim 12, wherein the isolator device comprises one or more photovoltaic drivers.

17. The system of claim 12, wherein the system further comprises:
   a power regulator operatively coupled with the controller, wherein the power regulator regulates the DC power input to a voltage level used by the system; and
   input power monitoring and protection means operatively coupled with the power regulator and configured to monitor status of power source, wherein power source monitoring comprises monitoring of one or a combination of voltage, current, power, and temperature, and wherein feedback of the monitoring is given to the controller.

18. The system of claim 17, wherein the system further comprises an output power monitoring and protection means operatively coupled with the power regulator and configured to monitor status of power source, wherein power source monitoring comprises monitoring of one or a combination of voltage, current, power, and temperature, and wherein feedback of the monitoring is given to the controller.

19. A method for recognizing and swapping polarity for DC powered devices comprising the steps of:
   identifying, using a polarity detector, polarity of DC power input and sending an output to a controller based on identification of polarity of said DC power input;
   setting, based on said output, through the controller, one or more switches of a power switch array for executing polarity switching;
   giving as output, using a rectifier bridge, required polarity for power regulator of the controller; and
   using an isolated power regulator that is configured between the rectifier bridge module and the controller to convert the DC power input to a lower voltage to enable required isolation between the DC power input and the controller to be achieved.

20. The method of claim 19, wherein when DC power input to the isolated power regulator exceeds beyond a defined threshold, predefined voltage is sourced to the controller.

21. The method of claim 19, wherein at least one of the one or more switches of the power switch array comprises two MOSFETs that are configured in face-to-face mode or back-to-back mode to function as a single one of the one or more switches in the power switch array.

* * * * *